United States Patent [19]

Guenther

[11] 4,149,760
[45] Apr. 17, 1979

[54] SNAP CAGE OF SYNTHETIC MATERIAL

[75] Inventor: Fritz Guenther, Stuttgart, Fed. Rep. of Germany

[73] Assignee: SKF Kugellagerfabriken GmbH, Schweinfurt, Fed. Rep. of Germany

[21] Appl. No.: 764,977

[22] Filed: Feb. 2, 1977

[30] Foreign Application Priority Data

Feb. 7, 1976 [DE] Fed. Rep. of Germany ....... 0351820

[51] Int. Cl.² ................. F16C 19/20; F16C 33/00
[52] U.S. Cl. .................................................... 308/201
[58] Field of Search ............... 308/188, 189 R, 201, 308/202, 217, 235

[56] References Cited

U.S. PATENT DOCUMENTS 3,146,039  8/1964  Dunn ...................................... 308/201
3,506,316  4/1970  McKee ................................... 308/201
3,645,592  2/1972  Flandrena ............................. 308/201

FOREIGN PATENT DOCUMENTS 378511  10/1907  France ..................................... 308/201
1145720 10/1957  France.
833847   5/1960  United Kingdom.

Primary Examiner—Trygve M. Blix
Assistant Examiner—D. W. Keen
Attorney, Agent, or Firm—Daniel M. Rosen

[57] ABSTRACT

A snap cage for a bearing wherein the diameter of the peripheral surface of the cage, viewed in axial direction is diminished, or the diameter of the bore surface of the cage is augmented, towards the web ends, the ends of the webs being formed such that the faces of the web ends lie on one side of the pitch circle.

7 Claims, 8 Drawing Figures

Fig. 6
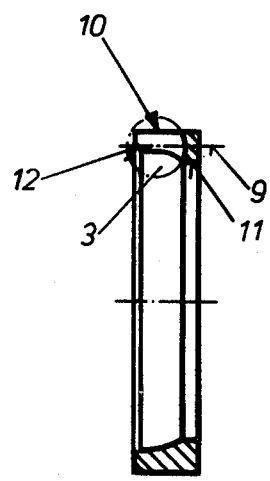
Fig. 7
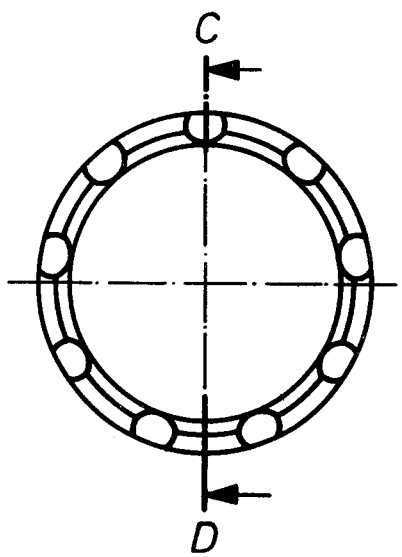
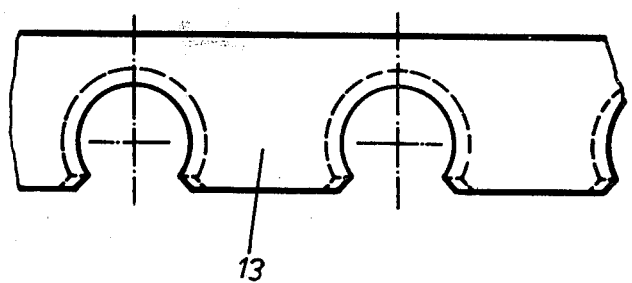
Fig. 8

SNAP CAGE OF SYNTHETIC MATERIAL

This invention relates to rolling bearings, and particularly to a snap cage for use in a rolling bearing construction. In radial bearings, a known construction employs a snap cage of synthetic material wherein pockets are arranged between the webs of the cage with an opening smaller in radial direction than the diameter of the rolling members.

In conventional snap cage constructions the faces of the web ends are provided with slits or recesses extending radially, so that parts of the webs can yield elastically when the cage is snapped onto the balls. A cage of this construction has the disadvantage that it may easily pop out of the bearing, when being in an eccentric position, because the web parts are elastic in a circumferential direction.

It is also known that in such cages the web ends may be provided with slits extending axially to facilitate cage assembly. In such cages, however, the web ends will spring radially in service, so that vibrations may be generated at high speeds.

It is therefore the prime object of the present invention to provide a solid snap cage of synthetic material which may be easily assembled and cannot pop out of the bearing, when being in an eccentric position due to clearance.

The foregoing object is achieved in accordance with the present invention wherein the diameter of the peripheral surface of the cage, viewed in axial direction is diminished, or the diameter of the bore surface of the cage is augmented, towards the web ends, the ends of the webs being formed such that the faces of the web ends lie on one side of the pitch circle.

An advantageous embodiment of a snap cage in accordance with the present invention results if the diameter of the peripheral surface of the cage, viewed in axial direction, diminishes towards the ends of the webs until just above the pitch circle, and the ends of the webs are beveled. Alternatively, the diameter of the bore surface of the cage is augmented until just below the pitch circle, and the ends of the webs are beveled.

According to another feature of the invention, the faces at the web ends, viewed in circumferential direction, are preferably somewhat convex.

The present invention will now be described and illustrated in more detail with reference to two embodiments represented in the accompanying drawings, by way of example, wherein:

FIG. 6 shows a section C-D of another snap cage according to the invention;

FIG. 7 shows a side view of the cage of FIG. 6 as seen from the left; and

FIG. 8 shows a portion of a developed top view of the cage pictured in FIG. 6.

Figure 1:
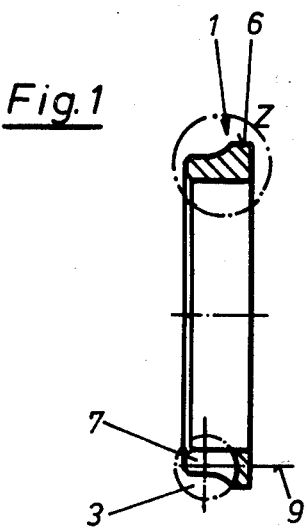
FIG. 1 shows a section A-B of a snap cage of synthetic material, according to the invention, for radial ball bearings.
Figure 2:
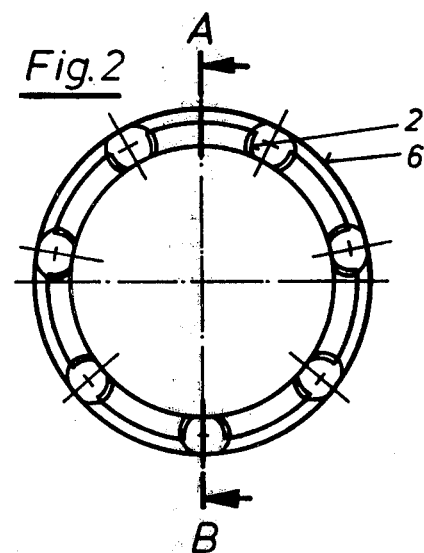
FIG. 2 shows a side view of the cage of FIG. 1 as seen from the left.
Figure 3:
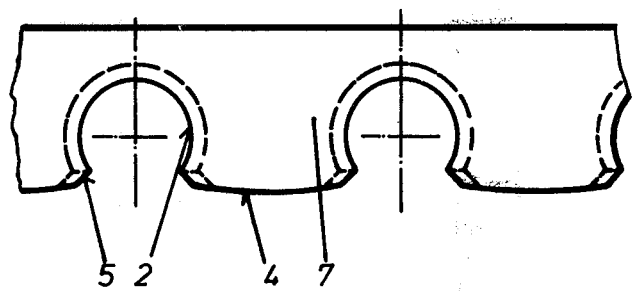
FIG. 3 shows a portion of a developed top view of the cage represented in FIG. 1.
Figure 4:
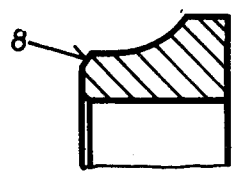
FIG. 4 shows a detail Z.
Figure 5:
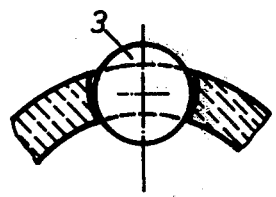
FIG. 5 shows a radial section of a cage pocket.

The cage 1 shown in FIGS. 1 to 5 has pockets 2 to accommodate balls 3, the walls of the pockets being curved to suit the periphery of balls 3. The webs 7 extend axially from a continuous ring, in the conventional manner. The free ends or faces 4 of the webs ends are plane or slightly convex in a peripheral direction. The edges of the webs have bevels 5 forming enlarged pocket openings. The diameter of the peripheral surface 6, viewed in the axial direction, diminishes towards the free ends of the webs 7 to just above the pitch circle 9, and the web ends are beveled at 8 so that the points of contact between the cage 1 and the balls 3, before snapping into position, lie below the pitch circle, and the webs 7 are positively able to retreat elastically inward as the cage 1 is snapped onto the balls 3. The inside diameter of the pockets 2 is closer in radial direction than the ball diameter, and the diameter of the peripheral surface in the region of the webs 7 is diminished only to such an extent just above the pitch circle 9, that even when the cage 1 is in an eccentric position due to clearance, the cage 1 cannot pop out of the bearing.

FIGS. 6 to 8 show a snap cage 10 of synthetic material, differing from the embodiment represented in FIGS. 1 to 5 only in that the diameter of the peripheral surface 6 is not reduced, but rather the diameter of the bore surface 11, viewed in axial direction, is enlarged towards the web ends to just below the pitch circle, and the ends of the webs are beveled at 12. As a result, the points of contact between the cage 10 and the balls 3, before snapping the cage into position, lie above the pitch circle. Thus, the webs 13 are able to give way radially outward when the cage 10 is snapped onto the balls 3.

In the assembling of a radial ball bearing, the balls 3 are loaded and distributed between the races (not shown), and the cage (1, 10) according to the invention is thrust in far enough to be in contact with the balls 3. Axial pressure on the cage (1, 10) then snaps it over the balls 3, the webs (7, 13) of the cage give way inward or outward respectively as previously described.

The embodiments described are merely examples of cages according to the invention. Changes in design are, of course, possible within the scope of the invention. Thus, for example, the diameter of the peripheral surface 6 of the cage 1, viewed in axial direction, may be diminished towards the ends of the webs 7 to below the pitch circle 9, and/or the diameter of the bore surface 11 of the cage 10 may be augmented to above the pitch circle.

The cage according to the invention is suitable for grooved ball bearings, in particular two-row grooved ball bearings, including for example water pump bearings.

Other modifications and variations within the spirit and scope of the present invention will be apparent to those skilled in the art.

What is claimed is:

1. In a snap cage of synthetic elastic material for radial bearings having rolling members, wherein a plurality of webs extending axially from a continuous ring and defining radially extending pockets therebetween for receiving said rolling members, and said webs have free ends defining openings therebetween enabling the cage to be elastically snapped onto the rolling members, whereby said webs define peripheral and bore surfaces on opposite sides of the pitch circle of rolling elements retained in said pockets; the improvement wherein the radial dimension of a first one of said surfaces varies gradually to approach said pitch circle toward said free ends of said webs, and said first surfaces at said free ends of said webs are bevelled whereby only the axial extremeties of said webs at said openings lie on the opposite relative side of said pitch circle, said free ends of said webs being slightly convex in the circumferential direction.

2. The snap cage of claim 1 wherein said first surface comprises said peripheral surface, said peripheral surface having a diameter that gradually reduces to just above the diameter of said pitch circle, the bevelled ends of said webs thereby reducing the diameter at the ends of said openings to points just below the pitch circle, whereby the free ends of said webs are forced elastically radially inward upon assembly of said cage on said rolling members in a bearing.

3. The snap cage of claim 2 wherein said pockets have dimensions at said bore surface that are smaller than the dimensions of said rolling members.

4. The snap cage of claim 1 for a bearing having balls for the rolling members, wherein said pockets are round and have diameters at said bore surface that are less than the diameters of said balls.

5. The snap cage of claim 1 wherein said bore surface comprises said first surface, the diameter of said bore increasing gradually toward said web ends to just below the diameter of said pitch circle and the axial extremities of said webs at said openings lie above said pitch circle due to the bevelling of said web ends, whereby said web ends are forced radially outward during assembly of said cage in a bearing.

6. The snap cage of claim 5 wherein said rolling members are balls.

7. The snap cage of claim 1 wherein said rolling elements are balls, and the walls of said pockets are curved to fit the periphery of said balls.

* * * * *